United States Patent
Chun et al.

(10) Patent No.: US 11,493,970 B2
(45) Date of Patent: Nov. 8, 2022

(54) TWO-STAGE DYNAMIC POWER SUPPLY VOLTAGE ADJUSTMENT

(71) Applicant: QUALCOMM INCORPORATED, San Diego, CA (US)

(72) Inventors: Christopher Kong Yee Chun, Austin, TX (US); Chandan Agarwalla, San Diego, CA (US); Dipti Ranjan Pal, Irvine, CA (US); Kumar Kanti Ghosh, San Diego, CA (US); Matthew Severson, Austin, TX (US); Nilanjan Banerjee, San Diego, CA (US); Joshua Stubbs, Longmont, CO (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/085,505

(22) Filed: Oct. 30, 2020

(65) Prior Publication Data

US 2022/0137687 A1 May 5, 2022

(51) Int. Cl.
*G06F 1/26* (2006.01)
*G06F 1/3296* (2019.01)
*G06F 1/3228* (2019.01)
*G06F 1/3287* (2019.01)

(52) U.S. Cl.
CPC .............. *G06F 1/26* (2013.01); *G06F 1/3228* (2013.01); *G06F 1/3296* (2013.01); *G06F 1/3287* (2013.01)

(58) Field of Classification Search
CPC ........ G06F 1/26; G06F 1/3287; G06F 1/3296; G06F 1/3228

USPC ................. 713/300, 310, 324, 502
See application file for complete search history.

(56) References Cited

U.S. PATENT DOCUMENTS

| | | | | |
|---|---|---|---|---|
| 5,534,766 A | * | 7/1996 | Bonissone | G05F 1/10 323/235 |
| 7,788,508 B1 | * | 8/2010 | Salmi | G06F 1/324 713/300 |
| 9,400,308 B2 | * | 7/2016 | Ibrahimovic | G06F 1/26 |
| 10,078,358 B2 | * | 9/2018 | Ochoa Munoz | G06F 1/324 |
| 10,416,692 B2 | * | 9/2019 | Lee | G06F 1/26 |

(Continued)

FOREIGN PATENT DOCUMENTS

| | | |
|---|---|---|
| EP | 3667457 A1 | 6/2020 |
| WO | 2019000218 A1 | 1/2019 |

OTHER PUBLICATIONS

International Search Report and Written Opinion—PCT/US2021/050489—ISA/EPO—dated Dec. 23, 2021.

*Primary Examiner* — Ji H Bae
(74) *Attorney, Agent, or Firm* — Smith Tempel Blaha LLC/Qualcomm

(57) ABSTRACT

Dynamic power supply voltage adjustment in a computing device may involve two stages. In a first stage, a first method for adjusting a power supply voltage may be disabled. While the first method remains disabled, a request to adjust the power supply voltage from an initial value to a target value using a second method may be received. The second method may be initiated in response to the request if a time interval has elapsed since a previous request to adjust the power supply voltage. In a second stage, the first method may be enabled when it has been determined that the power supply voltage has reached the target value.

24 Claims, 6 Drawing Sheets

(56) References Cited

U.S. PATENT DOCUMENTS

| | | | |
|---|---|---|---|
| 2011/0271124 A1* | 11/2011 | Verdun | G06F 1/3296 |
| | | | 713/300 |
| 2012/0023382 A1 | 1/2012 | Sandhu et al. | |
| 2014/0281630 A1* | 9/2014 | Chien | G06F 1/3203 |
| | | | 713/323 |
| 2016/0187961 A1* | 6/2016 | Elibol | G06F 1/3203 |
| | | | 713/323 |
| 2017/0212540 A1* | 7/2017 | Cho | G05F 1/56 |
| 2018/0232033 A1 | 8/2018 | Gu et al. | |

* cited by examiner

TWO-STAGE DYNAMIC POWER SUPPLY VOLTAGE ADJUSTMENT

DESCRIPTION OF THE RELATED ART

Portable computing devices ("PCD"s) are becoming necessities for people on personal and professional levels. These devices may include mobile phones, tablet computers, palmtop computers, portable digital assistants ("PDA"s), portable game consoles, and other portable electronic devices. PCDs commonly contain integrated circuits or systems-on-a-chip ("SoC"s) that include numerous components or subsystems designed to work together to deliver functionality to a user. For example, an SoC may contain any number of processing engines, such as central processing units ("CPU"s), graphical processing units ("GPU"s), digital signal processors ("DSP"s), neural processing units ("NPU"s), wireless transceiver units (also referred to as modems), etc.

As a PCD is powered by a battery, power management is a significant consideration. Effective PCD power management helps provide long battery time, among other benefits. A number of techniques are known to dynamically adjust a power supply voltage to attempt to maximize battery time.

Dynamic clock and voltage scaling ("DCVS") is a technique or method by which the frequency and voltage at which a processor is operated are adjusted dynamically, i.e., in real time in response to changes in operating conditions, to deliver a desired balance or tradeoff between power consumption and performance level. When lower power consumption is of higher priority than higher performance, a power controller may decrease the clock frequency and voltage, and when higher performance is of higher priority than lower power consumption, the power controller may increase the clock frequency and voltage.

Core power reduction or "CPR" (also known as adaptive voltage scaling) is another technique or method for dynamically adjusting a power supply voltage. CPR relates to exploiting variations in semiconductor fabrication parameters that may enable a particular chip to operate properly at a lower voltage than a value specified by the manufacturer. DCVS and CPR may be used in conjunction with each other to provide relatively coarse and relatively fine voltage adjustments, respectively.

A voltage regulator may respond to a command from a power controller to change a power supply voltage by changing the voltage at its output to a new value. The output of the voltage regulator is coupled to a power supply rail that supplies electronic components of the chip. However, the supply rail voltage does not reach the new value instantaneously. Rather, the amount of current being drawn by the load causes the supply rail voltage to change exponentially to the new value. Some power supply voltage adjustment methods, including CPR, cannot provide accurate results unless the supply rail voltage is stable or settled at the time the method is performed. A common solution to this potential problem is for the power controller to only issue a command to the voltage regulator to adjust the supply voltage if a time interval, sufficient to ensure the supply rail voltage has settled since a previous adjustment, has elapsed since the power controller last issued such a command. This time interval or delay is based on worst-case load, process corners, or other conditions. Basing a control method on a worst-case estimate may be inefficient or otherwise disadvantageous.

SUMMARY OF THE DISCLOSURE

Systems, methods, computer-readable media, and other examples are disclosed for dynamic power supply voltage adjustment in a computing device.

An exemplary method for dynamic power supply voltage adjustment in a computing device may include disabling a first method for adjusting a power supply voltage and, while the first method is disabled, receiving a request to adjust the power supply voltage from an initial value to a target value using a second method. The exemplary method may further include initiating the second method in response to the request if a time interval has elapsed since a previous request to adjust the power supply voltage using the second method. The exemplary method may still further include determining whether the power supply voltage has reached the target value, and enabling the first method if the power supply voltage has reached the target value.

An exemplary system for dynamic power supply voltage adjustment in a computing device may include core logic, first voltage adjustment logic, and second voltage adjustment logic. The first voltage adjustment logic may be configured to be enabled and disabled. The second voltage adjustment logic may be configured to receive, while the first voltage adjustment logic is disabled, a request to adjust a power supply voltage from an initial value to a target value. The second voltage adjustment logic may be further configured to determine whether a time interval has elapsed since a previous request to adjust the power supply voltage, and if the time interval has elapsed, to provide the request to the voltage regulator system. The core logic may be configured to determine, while the first voltage adjustment logic is disabled, whether the power supply voltage has reached the target value, and if the power supply voltage has reached the target value, to enable the first voltage adjustment logic. The core logic may be further configured to disable the first voltage adjustment logic before providing the request to the voltage regulator system.

Another exemplary system for dynamic power supply voltage adjustment in a computing device may include means for activating first voltage adjustment logic when the first voltage adjustment logic is enabled and for refraining from activating the first voltage adjustment logic when the first voltage adjustment logic is disabled. The exemplary system may further include means for receiving, while the first voltage adjustment logic is disabled, a request to adjust a power supply voltage from an initial value to a target value, for determining whether a time interval has elapsed since a previous request to adjust the power supply voltage, and if the time interval has elapsed, for activating second voltage adjustment logic to provide the request to a voltage regulator system. The exemplary system may still further include means for determining whether the power supply voltage has reached the target value and for enabling the first voltage adjustment logic if the power supply voltage has reached the target value.

An exemplary computer-readable medium for dynamic power supply voltage adjustment in a computing device may comprise a non-transitory computer-readable medium having instructions stored thereon in computer-executable form. The instructions, when executed by a processing system of the computing device, may configure the processing system to disable a first method for adjusting a power supply voltage. The instructions may further configure the processing system to receive, while the first method is disabled, a request to adjust the power supply voltage from an initial value to a target value using a second method. The instructions may still further configure the processing system to initiate the second method for adjusting the power supply voltage in response to the request if a time interval has elapsed since a previous request to adjust the power supply voltage. The instructions may yet further configure the processing system to determine, while the first is disabled, whether the power supply voltage has reached the target value, and manufacturer if the power supply voltage has reached the target value, to enable the first method for adjusting the power supply voltage.

BRIEF DESCRIPTION OF THE DRAWINGS

In the Figures, like reference numerals refer to like parts throughout the various views unless otherwise indicated. For reference numerals with letter character designations such as "102A" or "102B," the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." The word "illustrative" may be used herein synonymously with "exemplary." Any aspect described herein as "exemplary" is not necessarily to be construed as preferred or advantageous over other aspects. The term "coupled" may be used herein to mean connected via zero or more intervening elements, in contrast with the term "directly connected," which may be used herein to mean connected via no intervening elements.

A reference to a task, thread, etc., executing on a processor means that the software (instructions, data, etc.) represented by the task is executed by a processor retrieving and executing portions of the software from a memory, storing results in a memory, etc., in a manner in accordance with conventional computing principles well understood by one of ordinary skill in the art. In some of the exemplary embodiments described herein, an explicit description of such a memory may be omitted for purposes of clarity.

Figure 1:
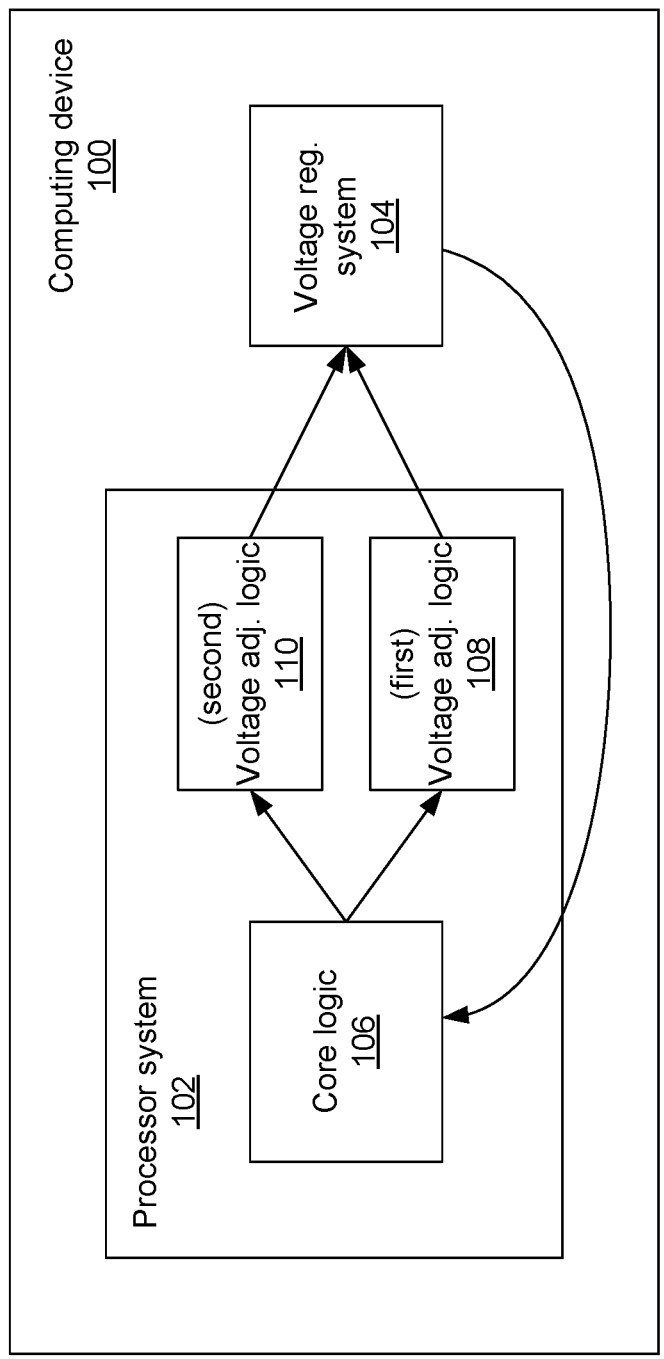
FIG. 1 is a block diagram illustrating a dynamic power supply voltage adjustment system in a computing device, in accordance with exemplary embodiments.

As illustrated in FIG. 1, in an illustrative or exemplary embodiment, a computing device 100 may include a processor system 102 and a voltage regulator system 104. The computing device 100 may be of any kind in which power management is a consideration, such as, for example, a portable computing device. The processor system 102 may include core logic 106, first voltage adjustment logic 108, and second voltage adjustment logic 110. The voltage regulator system 104 may supply power (i.e., a voltage at a current determined by a load) to one or more components of the device 100. The components supplied with power by the voltage regulator system 104 may include the core logic 106. Although not shown for purposes of clarity, the computing device 100 may include other such core logic, which may be supplied by the voltage regulator system 104 or a different voltage regulator system.

The first voltage adjustment logic 108 and second voltage adjustment logic 110 each may comprise a different type of voltage adjustment logic, i.e., based on a different algorithm or method than each other. The first voltage adjustment logic 108 may be configured to provide voltage adjustments of a first step size, and the second voltage adjustment logic 110 may be configured to provide voltage adjustments of a second step size (i.e., different than the first step size). For example, the first voltage adjustment logic 108 may be configured to provide coarser voltage adjustments than the second voltage adjustment logic 110, and accordingly, the second voltage adjustment logic 110 may be configured to provide finer voltage adjustments than the first voltage adjustment logic 108. As used in this disclosure, the terms "coarse" and "fine" are defined only in relation to each other: coarse voltage adjustments comprise larger steps than fine voltage adjustments, and fine voltage adjustments comprise smaller steps than coarse voltage adjustments.

The first voltage adjustment logic 108 may be configured to be enabled and disabled by the core logic 106. When enabled, the first voltage adjustment logic 108 may provide voltage adjustment requests to the voltage regulator system 104. When disabled, the first voltage adjustment logic 108 may refrain from (i.e., be constrained against) providing voltage adjustment requests to the voltage regulator system 104.

The second voltage adjustment logic 110 may be configured to receive, while the first voltage adjustment logic 108 is disabled, a request from the core logic 106 to adjust a power supply voltage from a starting or initial value to an ending or target value. The second voltage adjustment logic 110 may further be configured to determine whether a time interval has elapsed since a previous request from the core logic 106 to adjust the power supply voltage. If the time interval has elapsed, the second voltage adjustment logic 110 may provide the request to the voltage regulator system 104. The second voltage adjustment logic 110 may provide the request to the voltage regulator system 104 only if the second voltage adjustment logic 110 determines that the time interval has elapsed. Alternatively, the core logic 106 may determine whether the time interval has elapsed based on an indication from another element, such as the second voltage adjustment logic 110 or the voltage regulator system 104. In such an embodiment, the core logic 106 may provide the request to the second voltage adjustment logic 110 only if the core logic 106 receives the indication that the time interval has elapsed, and the second voltage adjustment logic 110 may, in turn, provide a similar request to the voltage regulator system 104 without further regard to the time interval.

The core logic 106 may be configured to be signaled or otherwise to determine, while the first voltage adjustment logic remains disabled, whether the power supply voltage has reached the target value. As described below, such a power supply output voltage may not change instantaneously from the initial value to the target value but rather may reach the target value in an exponential manner. If the power supply voltage has reached the target value, the core logic 106 may enable the first voltage adjustment logic 108. However, before providing the above-referenced request to the second voltage adjustment logic 110, the core logic 106 may disable the first voltage adjustment logic 108.

Figure 2:
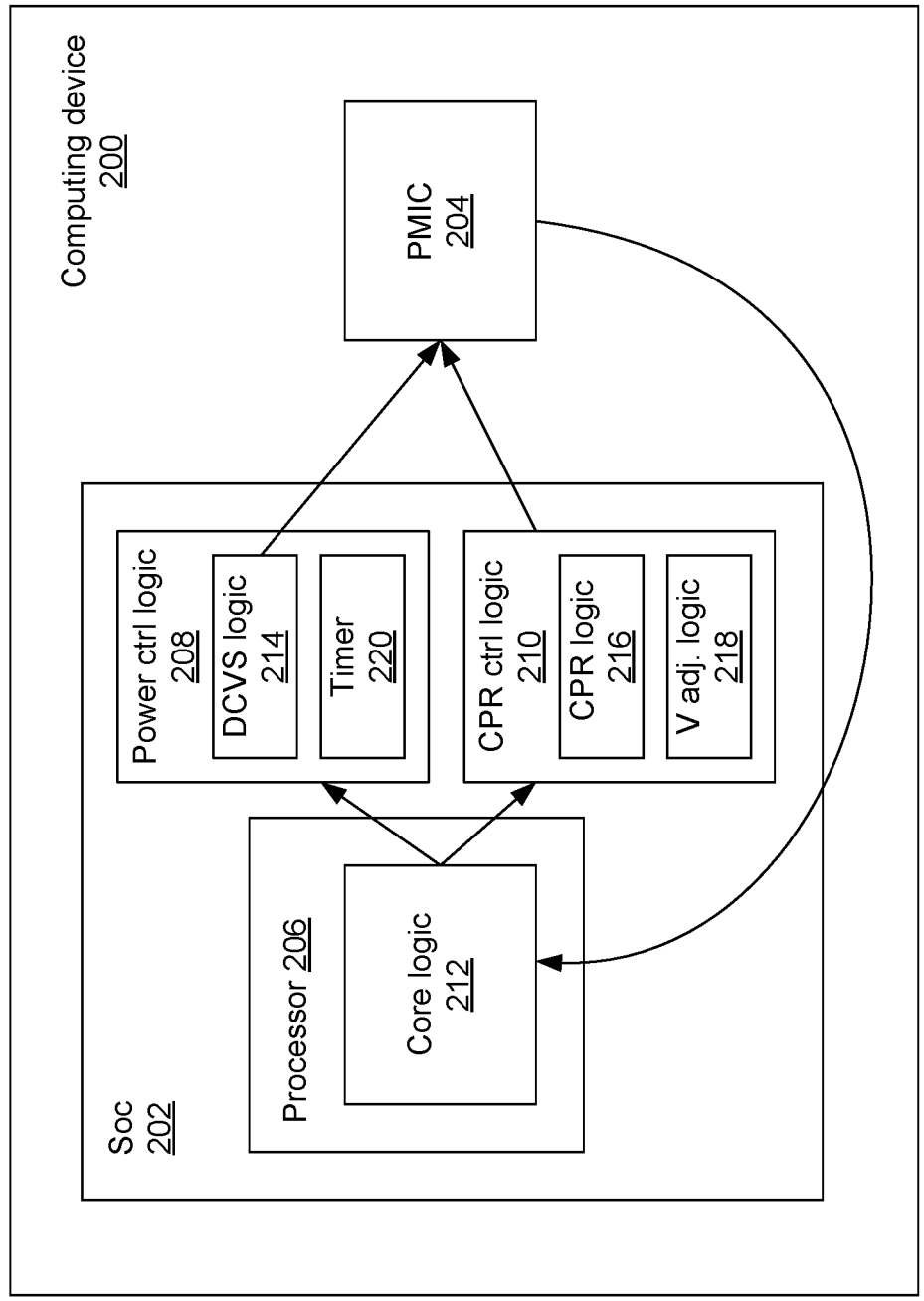
FIG. 2 is a block diagram illustrating another dynamic power supply voltage adjustment system in a computing device, in accordance with exemplary embodiments.

As illustrated in FIG. 2, in another exemplary embodiment, a computing device 200 may include a system-on-a-chip ("SoC") 202 and a power management integrated circuit ("PMIC") 204. The SoC 202 may include a processor 206, power control logic 208, and CPR control logic 210. The processor 206 may provide or embody the core logic 212 by being configured by software in execution. The core logic 212, power control logic 208, CPR control logic 210, and the PMIC 204 may be examples of the core logic 106, first voltage adjustment logic 108, second voltage adjustment logic 110, and voltage regulator system 104, respectively, described above with regard to FIG. 1. Although not shown for purposes of clarity, the PMIC 204 may power one or more voltage rails that supply one or more SoC subsystems, such as a subsystem that includes the core logic 212. Such a subsystem may include one or more processors or processor cores. Although not shown for purposes of clarity, the processor 206 or other processor or processor core may include other such core logic.

The power control logic 208 may include DCVS logic 214. The core logic 212 may in a conventional manner determine a target supply voltage at which it may operate in order to achieve a power-versus-performance balance, as understood by one of ordinary skill in the art. The core logic 212 may provide a request to adjust its supply voltage to the power control logic 208. The power control logic 208 may, in response, provide a request to adjust the supply voltage to the PMIC 204. In providing the request, the power control logic 208 may take into account not only the request received from the core logic 212 but also similar requests received from other core logic (not shown) that may be supplied by the same supply voltage rail from the PMIC 204. In providing the request, the power control logic 208 may use DCVS logic 214, which may operate based on DCVS principles or algorithms. Although not directly relevant to the present disclosure, in accordance with DCVS principles the power control logic 208 may provide a request to adjust a frequency of a clock signal provided to the core logic 212 in conjunction with the request to adjust the supply voltage. As such principles, algorithms and other aspects of DCVS logic 214 are well known, they are not described herein.

The CPR control logic 210 may similarly be conventional or well-known and may comprise, for example, CPR logic 216 and CPR voltage adjustment logic 218. As understood by one of ordinary skill in the art, the CPR logic 216 may use information received from sensors (not shown) distributed on the SoC 202 as closed-loop feedback to determine whether a supply voltage can be reduced (and thereby save power) without adversely affecting chip-level operation of the SoC 202. For example, the sensors may include a delay chain (not shown) having the same operating voltage as the surrounding chip logic. Using a closed-loop (i.e., feedback-based) method, the CPR logic 216 may determine a lowest voltage at which the delay chain operates properly at a desired clock frequency (i.e., the clock frequency at which the surrounding chip logic is then operating). As understood by one of ordinary skill in the art, in some examples CPR produces fine voltage adjustments, in contrast with coarse voltage adjustments produced by DCVS. Nevertheless, in other examples CPR may produce coarser voltage adjustments than CPR. If the CPR logic 216 determines that a supply voltage can be reduced without adversely affecting operation of the SoC 202, the CPR voltage adjustment logic 218 may provide a request to the PMIC 204 to reduce the supply voltage. For the CPR logic 216 to produce accurate results, i.e., to perform the closed-loop CPR algorithm or method properly, the supply voltage on which the sensor-instrumented SoC circuitry operates must be stable. Although not separately shown in FIG. 2 for purposes of clarity, the CPR control logic 210 includes enablement and disablement circuitry or logic gating that enables and disables the CPR logic 216. As described below, the CPR logic 216 is disabled until it is determined that the supply voltage is stable.

The power control logic 208 may also include a timer 220. As described below, the power control logic 208 may start the timer 220 when it provides a request to adjust the power supply voltage to the PMIC 204 based on a determination by the DCVS logic 214. The power control logic 208 refrains from initiating a subsequent such DCVS voltage adjustment request until the timer expires or there is otherwise an indication that a time interval has elapsed since the previous such DCVS voltage adjustment request. Although in the embodiment illustrated in FIG. 2 the timer 220 provides the indication that the time interval has elapsed, in other embodiments an indication that the time interval has elapsed may be provided in another manner, such as, for example, in the form of a signal provided by the PMIC 204. As described in further detail below, a subsequent DCVS voltage adjustment request may be provided to the PMIC 204 even though the corresponding voltage rail supplied by the PMIC 204 has not reached (i.e., become stable at) a target value indicated by a previous request. In contrast, the CPR control logic 210 refrains from, i.e., is disabled from, issuing a request to adjust the power supply voltage to the PMIC 204 based on a determination by the CPR logic 216 until the voltage rail has become stable and the CPR logic 216 accordingly has been re-enabled. As described below with regard to FIG. 3, the voltage rail generally does not reach a stable value until substantially after the time interval. Stated conversely, the time interval is generally substantially shorter than the time required for the voltage rail to become stable.

Figure 3:
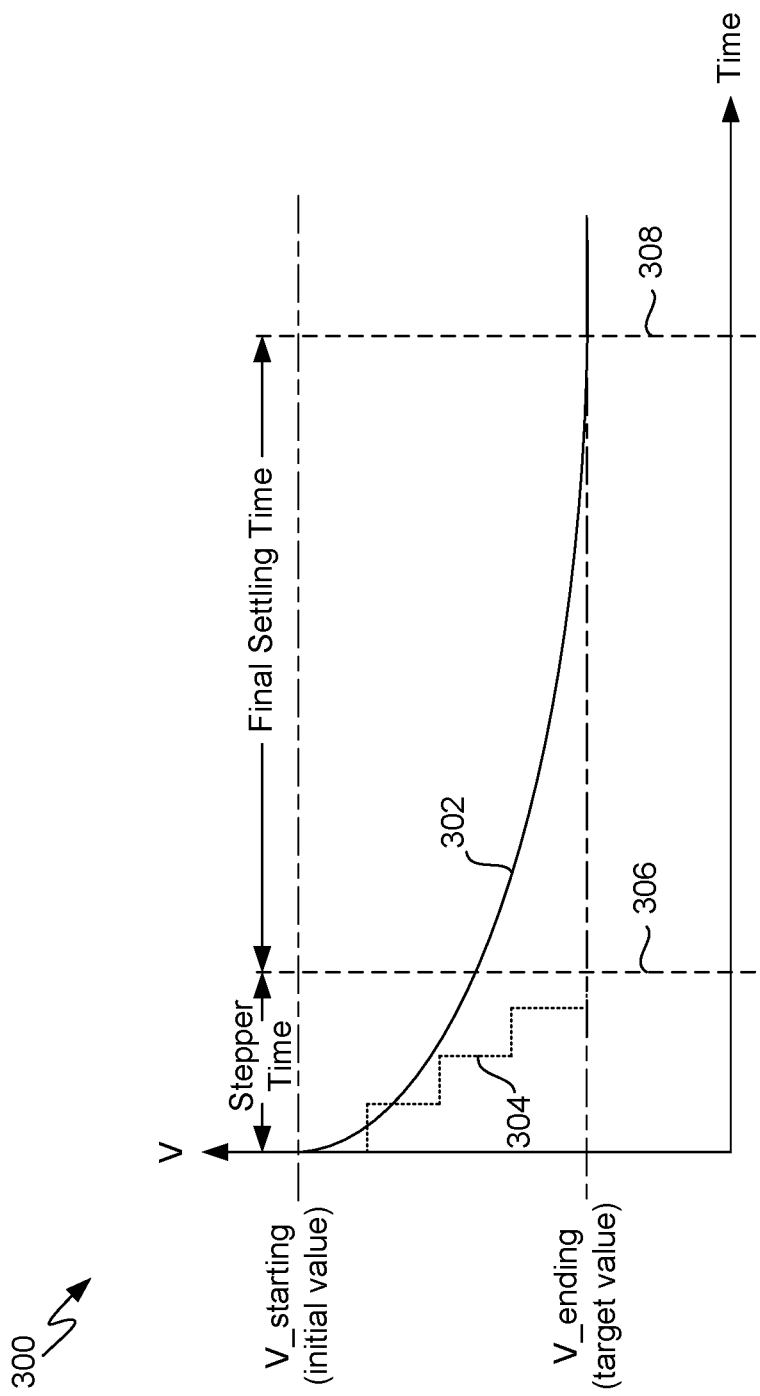
FIG. 3 is a plot illustrating an example of a power supply voltage exponentially decreasing from a starting or initial value to an ending or target value, in accordance with exemplary embodiments.

In FIG. 3, a plot 300 shows a power supply (rail) voltage 302 changing or transitioning from a starting or initial value to an ending or target value in response to voltage adjustments 304. The supply voltage 302 changes in an exponential manner due to the load (impedance). The slew rate (i.e., voltage change per unit of time) of the supply voltage 302 varies depending on the amount of current being drawn by the load. The smaller the load, the lower the slew rate, and thus the greater the amount of time until the supply voltage 302 reaches the target value. Although the plot 300 illustrates an example of an exponentially decaying or negatively slewing supply voltage 302 responding to adjustments 304 that decrease the voltage regulator output, in other examples (not shown) a supply voltage could similarly slew in an increasing or positive direction in response to adjustments that increase the voltage regulator output. Indeed, in some examples a supply voltage could increase during some time intervals and decrease during others, in response to various requests to increase and decrease the supply voltage. The present disclosure uses a decreasing supply voltage as an example because the slew rate is generally much lower for voltage decreases than for voltage increases due to the high impedance of the supply rail (discharge path), and the longer time for the supply voltage to reach the target value is potentially more problematic.

The voltage adjustments 304 may comprise a series of steps or successive values at which the voltage regulator sets its output and thus attempts to set the supply rail. Although it may be possible in some embodiments to slew a supply rail voltage from an initial value to a target value by only one voltage regulator adjustment (i.e., a single step) directly to the target value, in the exemplary embodiment described herein the PMIC 204 (FIG. 2) breaks the transition into multiple steps to help minimize ringing on the supply rail. It may be noted in FIG. 3 that the PMIC steps or voltage adjustments 304 define, in effect, a PMIC slew rate, which is generally faster than the supply rail slew rate in the case of a voltage decrease; the supply rail slew rate may match or nearly match the PMIC slew rate in the case of a voltage increase (not shown). Note in the illustrated example that at a time 306, after the last step or voltage adjustment 304 (i.e., when the PMIC 204 adjusts its output voltage to the target value), the supply voltage 302 as measured on the supply rail still has not reached the target value. Rather, in the illustrated example the supply voltage 302 does not reach the target value until a time 308. The PMIC 204 monitors the voltage rail and may issue a signal, such as an interrupt, to indicate it has determined that the supply voltage 302 is no longer changing, i.e., has settled. The supply voltage 302 may remain at the target value after time 308 until it may again be adjusted in the manner described above.

A conventional approach may be to refrain from initiating any voltage adjustments until the supply voltage has settled. In such a conventional approach, the time at which the supply voltage has settled may be estimated based on a worst-case load. This approach may be problematic, because overestimating the time may waste power if CPR could have begun sooner, and underestimating the time may result in inaccurate CPR (e.g., adjusting the voltage too low, possibly causing functional failure).

In the exemplary embodiment (FIG. 2), the power control logic 208 may refrain from issuing a DCVS voltage adjustment request to the PMIC 204 until after a time interval has elapsed since it previously issued such a voltage adjustment request. (If the power control logic 208 has not previously issued any voltage adjustment request since the SoC 206 was reset (i.e., when a system reset, boot, etc., occurred), the time interval may be considered elapsed.) The time interval may begin to be timed when the power control logic 208 issues a DCVS voltage adjustment request to the PMIC 204. The power control logic 208 may, for example, reset the above-described timer 220 contemporaneously with issuing a DCVS voltage adjustment request, and the timer 220 may signal when the time interval has elapsed. The timer 220 may, for example, run continuously, be resettable by the power control logic 208 or a system reset, and continue counting after being reset. The time interval may be based on how much time the PMIC 204 may take to step its output from an initial value to a target value. (The PMIC slew rate, i.e., voltage step per unit time, may be fixed or predetermined.) Alternatively, instead of using the timer 220, when the PMIC has stepped its output to the target value the PMIC 204 may provide the indication that the time interval has elapsed. Referring again to FIG. 3, note that this time interval (which may also be referred to as a "Stepper Time") may be substantially less than the amount of time it would take for the supply voltage 302 to become stable or settled at the target value at time 308. The difference between the time 308 at which the supply voltage 302 has settled and the time 306 at which the time interval has elapsed may be referred to as a "Final Settling Time."

Although not shown in the plot 300, in other examples the power control logic 208 may issue a subsequent DCVS voltage adjustment request to the PMIC 204 at any time after the time interval (Stepper Time) has elapsed, such as after the time 306. In contrast, the CPR control logic 210 may remain disabled (and the CPR logic 216 inactive) until after time 308 when the supply voltage 302 has settled. Accordingly, the CPR control logic 210 may refrain from providing CPR voltage adjustment requests to the PMIC 204 until after time 308 when the supply voltage 302 has settled.

Figure 4:
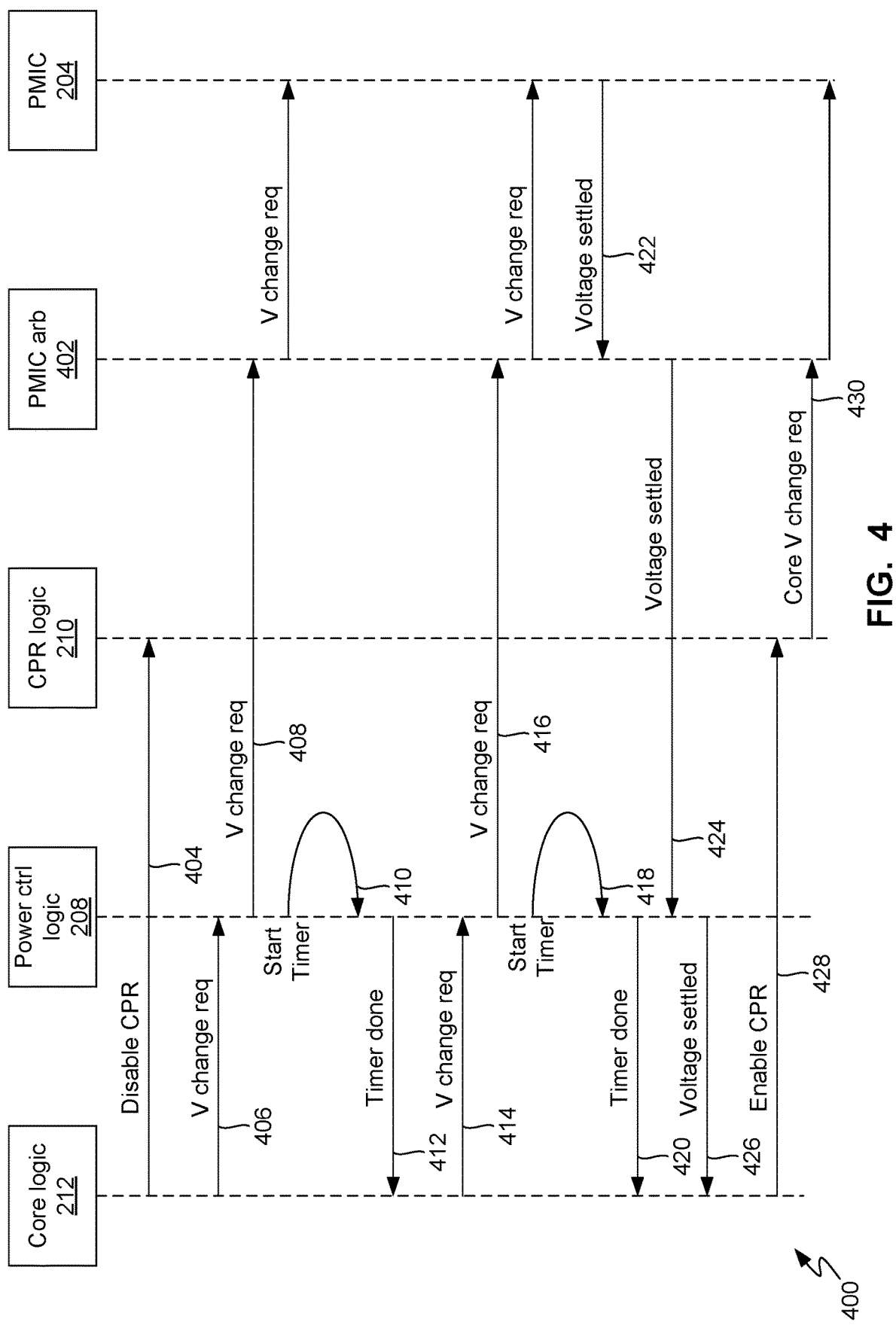
FIG. 4 is an activity diagram illustrating a method for dynamic power supply voltage adjustment in a computing device, in accordance with exemplary embodiments.

In FIG. 4, a sequence diagram or activity diagram 400 illustrates an exemplary sequence of communications or indications that may occur among the elements described above with regard to FIG. 2. Although not shown in FIG. 2 for purposes of clarity, such communications or indications may be conveyed by the use of buses or other interconnections through which messages or other signals may be communicated among the core logic 212, power control logic 208, CPR control logic 210, and PMIC 204. A PMIC arbitrator 402 (FIG. 4) may arbitrate messages between the PMIC 204 and various other elements.

The core logic 212 may provide a CPR disable indication 404 to the CPR control logic 210, indicating that the CPR control logic 210 is to disable its CPR logic 216 (FIG. 2). In response to the indication 404, the CPR logic 216 refrains from (i.e., is constrained against) being active or in a state in which it is performing the above-described closed-loop CPR voltage reduction method. When the CPR logic 216 is enabled, it may become active or enter a state in which it performs the CPR voltage reduction method. The CPR logic 216 may be activated in response to one or more conditions in addition to being enabled (e.g., it may perform CPR at certain times) or, alternatively, may be activated in response to being enabled, without regard to any other conditions.

After providing the disable indication 404 to the CPR control logic 210, the core logic 212 may provide a voltage change request indication 406 to the power control logic 208. The voltage change request indication 406 includes an indication of a target (voltage) value. For purposes of clarity in describing an exemplary sequence, this voltage change request indication 406 may be referred to as a "first" voltage change request indication, and this target voltage may be referred to as a "first" target value. In response, the power control logic 208 may provide a similar voltage change request indication 408 to the PMIC 204 (via the PMIC arbitrator 402). In response to the voltage change request indication 408, the PMIC 204 may step its output voltage toward the first target value. As described above with regard to FIG. 3, the power supply rail may begin to slew toward the first target value in response to the PMIC output.

Contemporaneously with providing the voltage change request indication 408 to the PMIC 204, the power control logic 208 may start the above-described timer 220 (FIG. 2). The timer 220 may output an indication 410 when the above-described time interval or Stepper Time has elapsed. In response to the indication 410, the power control logic 208 may provide an indication 412 to the core logic 212, indicating that the time interval has elapsed. As described above, the time interval is the amount of time it takes for the PMIC 204 to step its output to the target value.

Between providing the voltage change request indication 406 and receiving the indication 412 that the time interval has elapsed, the core logic 212 refrains from providing a subsequent (e.g., "second") voltage change request indication to the power control logic 208. However, at any time after receiving the indication 412 the core logic 212 may provide a subsequent or second voltage change request indication 414 to the power control logic 208. Such a second voltage change request indication 414 may include an indication of a new or second target value. In response, the power control logic 208 may provide a similar voltage change request indication 416 to the PMIC 204 (via the PMIC arbitrator 402). In response to the voltage change request indication 416, the PMIC 204 may step its output voltage toward the new or second target value. As described above with regard to FIG. 3, the power supply rail may begin to slew toward the new or second target value in response to the PMIC output. Note that the power supply rail voltage may not yet have reached the previously requested or first target value at the time of this second voltage change request indication 416.

After providing the second voltage change request indication 416 to the PMIC 204, the power control logic 208 may again start the above-described timer 220 (FIG. 2). The timer 220 may again output an indication 418 when the above-described time interval or Stepper Time has elapsed. In response to the indication 418, the power control logic 208 may provide an indication 420 to the core logic 212, indicating that the time interval has elapsed.

Between providing the second voltage change request indication 414 and receiving the indication 420 that the time interval has elapsed, the core logic 212 refrains from providing a subsequent (e.g., "third") voltage change request indication to the power control logic 208. Although the core logic 212 may provide such a third voltage change request after receiving the indication 420, this does not occur in the example illustrated in FIG. 4. Rather, before any such subsequent voltage change request, the PMIC 204 provides an indication 422 that the supply voltage has settled, i.e., has become stable at the target value. After stepping its output to the target value, the PMIC 204 may monitor the supply rail by continuing to measure the supply rail voltage. When the PMIC 204 determines that the supply rail voltage has reached the target value, the PMIC 204 may issue the indication 422, which may be in the form of an interrupt, for example. The interrupt may be communicated from PMIC 204 to the PMIC arbitrator 402 on the SoC 406 (FIG. 2). The PMIC arbitrator 402 may provide to the power control logic 208 a similar indication 424 that the supply voltage has settled at the target value. In response to the indication 424, the power control logic 208 may, in turn, provide to the core logic 212 a similar indication 426 that the supply voltage has settled at the target value.

Although in the example illustrated in FIG. 4 the core logic 212 provides a second voltage change request indication 414 before the core logic 212 receives the indication 424 that the supply voltage has settled, in other exemplary sequences (not shown) the core logic 212 may receive such an indication that the supply voltage has settled before providing a second voltage change request indication. The core logic 212 may provide any number of successive voltage change requests, so long as an amount of time greater than or equal to the time interval has elapsed between the previous voltage change request and the subsequent (next) voltage change request.

In response to the indication 426 that the supply voltage has settled at the target value, the core logic 212 may provide a CPR enable indication 418 to the CPR control logic 210, indicating that the CPR control logic 210 is to enable its CPR logic 216 (FIG. 2). The indication 404 enables the CPR logic 216 to become active or in a state in which it is performing the above-described closed-loop CPR voltage reduction method. As a result of performing the CPR method, the CPR control logic 210 may provide a voltage change request indication 430 to the PMIC 204 (via the PMIC arbitrator 402).

Although in the exemplary embodiments described herein the two voltage adjustment methods are DCVS and CPR, in other embodiments the voltage adjustment methods may be of any other types. In some embodiments, for example, the first voltage adjustment method may provide coarse voltage adjustments, while the second voltage adjustment method may provide fine voltage adjustments.

Figure 5:
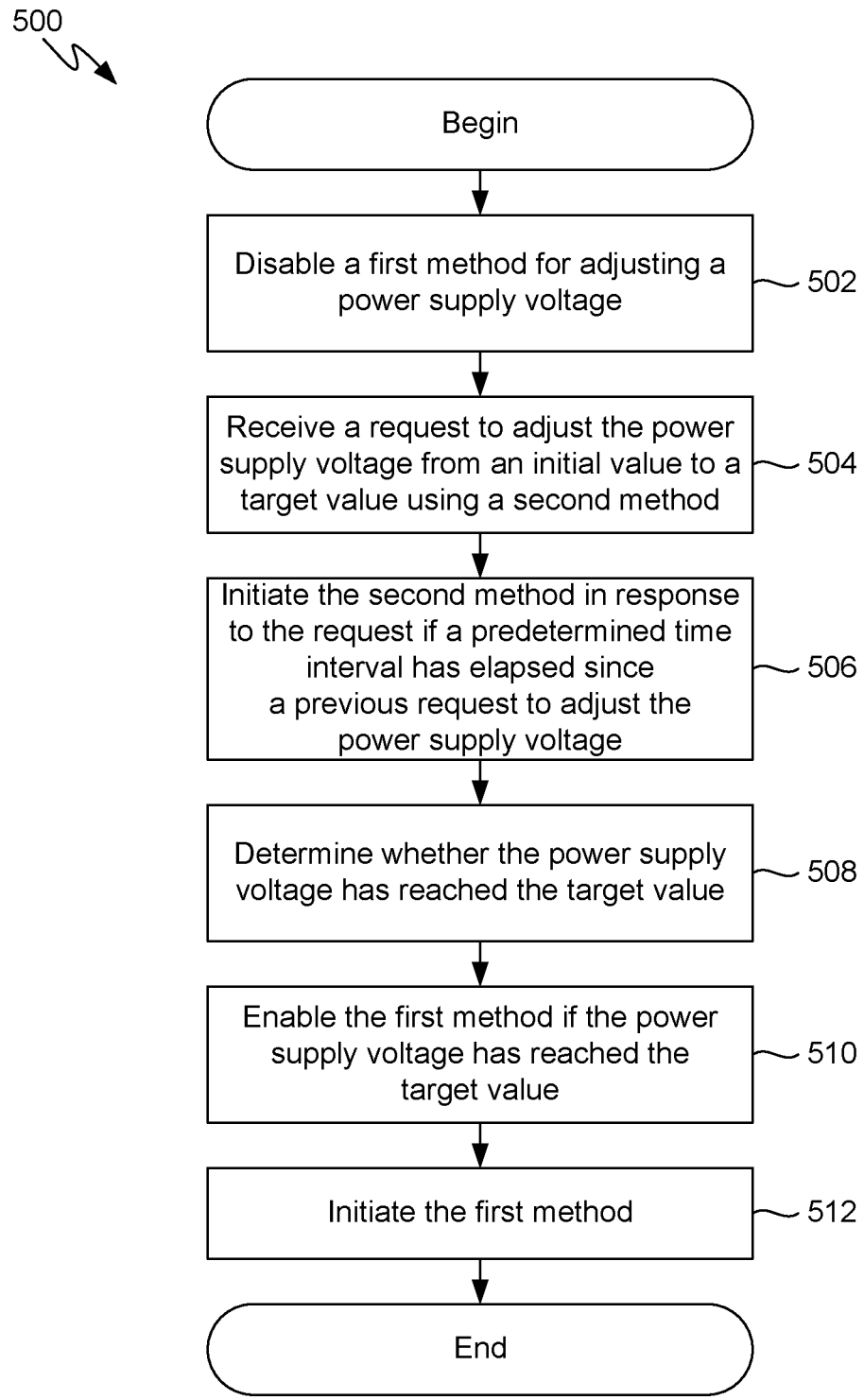
FIG. 5 is a flow diagram illustrating a method for dynamic power supply voltage adjustment in a computing device, in accordance with exemplary embodiments.

As illustrated in FIG. 5, a method 500 for dynamic power supply voltage adjustment in a computing device may include the following. It should be understood that the method 500 represents an example or embodiment, and in other embodiments some of the steps or actions described below, or similar steps or actions, may occur in a different order than in the exemplary method 500, or may be omitted. For purposes of example, the method 500 may be described in relation to one or both of the computing devices 100 (FIG. 1) or 200 (FIG. 2). Nevertheless, the method 500 or a related method may be applied to other computing devices, systems, etc.

As indicated by block 502, a first method for adjusting a power supply voltage may be disabled. The first method may be, for example, CPR. As indicated by block 504, a request to adjust the power supply voltage from an initial value to a target value using a second method may be received. The second method may be, for example, DCVS. As indicated by block 506, the second method may be initiated in response to the request if a predetermined time interval has elapsed since a previous request to adjust the power supply voltage using the second method. As indicated by block 508, it may be determined whether the power supply voltage has reached the target value. As indicated by block 510, the first method may then be enabled if it is determined that the power supply voltage has reached the target value. As indicated by block 512, the first method, once enabled, may be initiated (e.g., logic embodying the first method may be activated so as to perform the first method).

Figure 6:
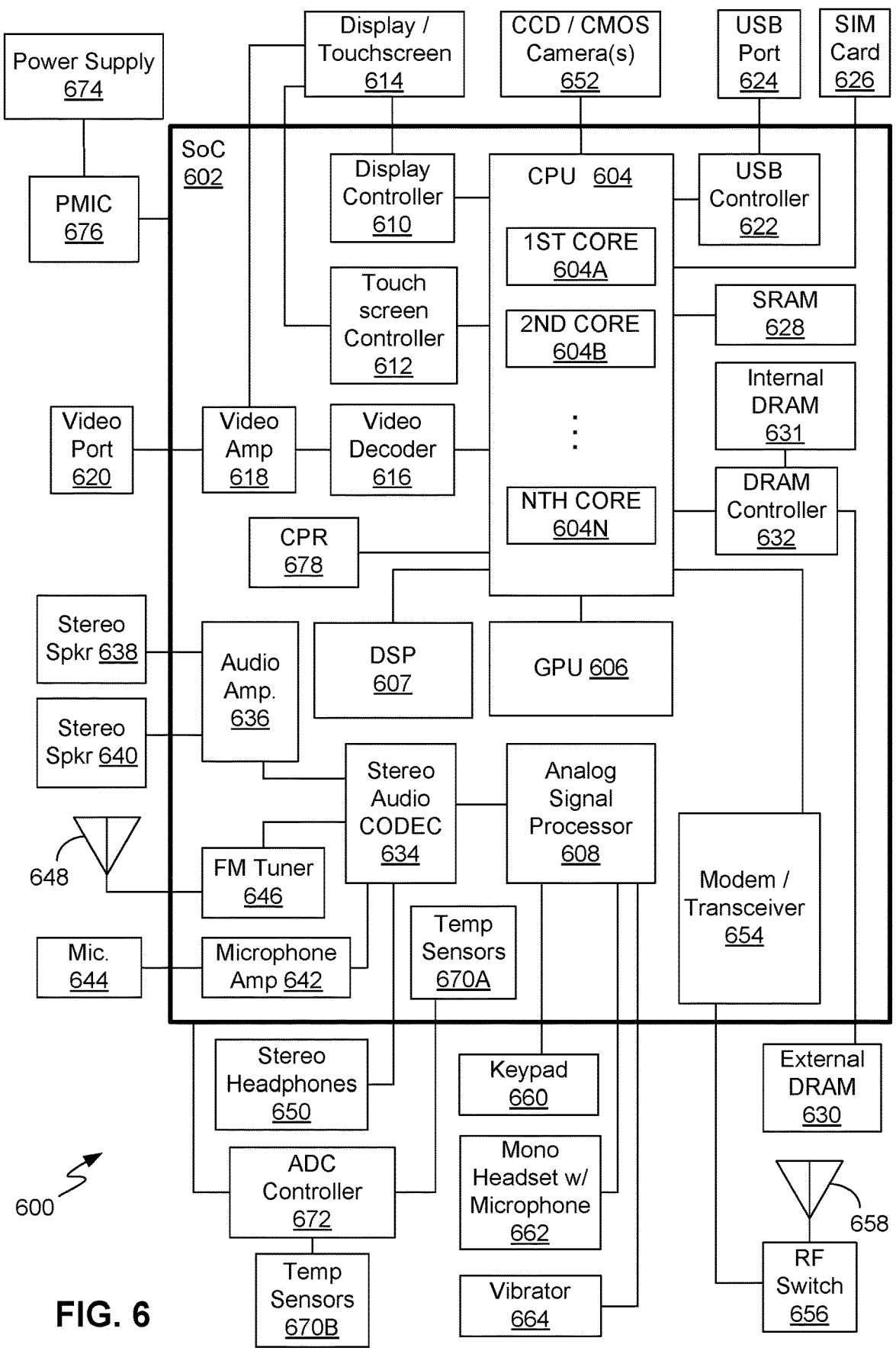
FIG. 6 is a block diagram illustrating a computing device, in accordance with exemplary embodiments.

As illustrated in FIG. 6, exemplary embodiments of systems and methods for dynamic power supply voltage adjustment in a computing device may be provided in a portable computing device ("PCD") 600. The PCD 600 may be an example of the computing device 100 (FIG. 1) or 200 (FIG. 2).

The PCD 600 may include an SoC 602, which may be an example of the above-described SoC 202 (FIG. 2). The SoC 602 may include a CPU 604, a GPU 606, a DSP 607, an analog signal processor 608, or other processors. The CPU 604 may include multiple cores, such as a first core 604A, a second core 604B, etc., through an Nth core 604N. In some examples of the SoC 602, the CPU 604 may be referred to as an application processor. The CPU 604, GPU 606, DSP 607, or other processor may be an example of the above-described processor 206 (FIG. 2) and may control, among other things, various aspects of the methods described above with regard to FIGS. 4-5. For example, the above-described core logic 106 (FIG. 1) or 212 (FIG. 2) may comprise a process or thread executing on the CPU 604. Also, for example, a DCVS method may be embodied in a portion of an operating system kernel executing on the CPU 604.

A display controller 610 and a touch-screen controller 612 may be coupled to the CPU 604. A touchscreen display 614 external to the SoC 602 may be coupled to the display controller 610 and the touch-screen controller 612. The PCD 600 may further include a video decoder 616 coupled to the CPU 604. A video amplifier 618 may be coupled to the video decoder 616 and the touchscreen display 614. A video port 620 may be coupled to the video amplifier 618. A universal serial bus ("USB") controller 622 may also be coupled to CPU 604, and a USB port 624 may be coupled to the USB controller 622. A subscriber identity module ("SIM") card 626 may also be coupled to the CPU 604.

One or more memories may be coupled to the CPU 604. The one or more memories may include both volatile and non-volatile memories. Examples of volatile memories include static random access memory ("SRAM") 628 and dynamic RAMs ("DRAM's) 630 and 631. Such memories may be external to the SoC 602, such as the DRAM 630, or internal to the SoC 602, such as the DRAM 631. A DRAM controller 632 coupled to the CPU 604 may control the writing of data to, and reading of data from, the DRAMs 630 and 631. In other embodiments, such a DRAM controller may be included within a processor, such as the CPU 604.

A stereo audio CODEC 634 may be coupled to the analog signal processor 608. Further, an audio amplifier 636 may be coupled to the stereo audio CODEC 634. First and second stereo speakers 638 and 640, respectively, may be coupled to the audio amplifier 636. In addition, a microphone amplifier 642 may be coupled to the stereo audio CODEC 634, and a microphone 644 may be coupled to the microphone amplifier 642. A frequency modulation ("FM") radio tuner 646 may be coupled to the stereo audio CODEC 634. An FM antenna 648 may be coupled to the FM radio tuner 646. Further, stereo headphones 650 may be coupled to the stereo audio CODEC 634. Other devices that may be coupled to the CPU 604 include one or more digital (e.g., CCD or CMOS) cameras 652. In addition, a keypad 660, a mono headset with a microphone 662, and a vibrator device 664 may be coupled to the analog signal processor 608.

A radio frequency (RF) transceiver or modem 654 may be coupled to the analog signal processor 608 and CPU 604. An RF switch 656 may be coupled to the modem 654 and an RF antenna 658.

The SoC 602 may have one or more internal or on-chip thermal sensors 670A and may be coupled to one or more external or off-chip thermal sensors 670B. An analog-to-digital converter ("ADC") controller 672 may convert voltage drops produced by the thermal sensors 670A and 670B to digital signals.

A power supply 674 and a power management integrated circuit ("PMIC") 676 may supply power to the SoC 602 via one or more voltage rails (not shown). The PMIC 676 may be an example of the above-described PMIC 204 (FIG. 2). The SoC 602 may include CPR control logic 678, which may be an example of the above-described CPR control logic 210 (FIG. 2).

Firmware or software may be stored in any of the above-described memories, such as DRAM 630 or 631, SRAM 628, etc., or may be stored in a local memory directly accessible by the processor hardware on which the software or firmware executes. Execution of such firmware or software may control aspects of any of the methods described above with regard to FIGS. 4-5, or configure aspects any of the systems described above with regard to FIGS. 1-2. Any such memory or other non-transitory storage medium having firmware or software stored therein in computer-readable form for execution by processor hardware may be an example of a "computer-readable medium," as the term is understood in the patent lexicon.

Alternative embodiments will become apparent to one of ordinary skill in the art to which the invention pertains. Therefore, although selected aspects have been illustrated and described in detail, it will be understood that various substitutions and alterations may be made therein.

What is claimed is:

1. A method for dynamic power supply voltage adjustment in a computing device, comprising:
    setting a power supply voltage with a first power logic;
    disabling the first power logic;
    receiving, while the first power logic is disabled, a request to adjust the power supply voltage from an initial value to a target value using a second power logic;
    initiating, while the first power logic is disabled, the second power logic in response to the request and an indication a time interval has elapsed since a previous request to adjust the power supply voltage;
    adjusting the power supply voltage with the second power logic from the initial value to the target value;
    determining, while the first power logic is disabled, whether the power supply voltage has reached the target value; and
    enabling the first power logic in response to determining the power supply voltage has reached the target value.

2. The method of claim 1, further comprising starting a timer contemporaneously with initiating the second power logic, wherein the indication the time interval has elapsed comprises an output of the timer.

3. The method of claim 1, further comprising receiving the indication the time interval has elapsed from a voltage regulator system.

4. The method of claim 1, wherein the second power logic comprises a voltage regulator stepping the power supply voltage through a plurality of intermediate voltage levels during the time interval.

5. The method of claim 1, further comprising initiating the first power logic after enabling the first power logic.

6. The method of claim 1, wherein the first power logic comprises a fine voltage adjustment logic, and the second power logic comprises a coarse voltage adjustment logic.

7. The method of claim 1, wherein the first power logic comprises Core Power Reduction (CPR) logic, and the second power logic comprises Dynamic Clock and Voltage Scaling (DCVS) logic.

8. The method of claim 1, wherein initiating the second power logic comprises a system-on-a-chip (SoC) signaling a power management integrated circuit (PMIC).

9. The method of claim 8, wherein determining whether the power supply voltage has reached the target value comprises determining whether the PMIC provides a signal to the SoC indicating the power supply voltage has reached the target value.

10. A system for dynamic power supply voltage adjustment in a computing device, comprising:
    first voltage adjustment logic configured to be enabled to provide voltage adjustment requests to a voltage regulator system and to be disabled from providing voltage adjustment requests to the voltage regulator system;
    second voltage adjustment logic configured to receive, while the first voltage adjustment logic is disabled, a request to adjust a power supply voltage from an initial value to a target value, the second voltage adjustment logic further configured to determine whether a time interval has elapsed since a previous request to adjust the power supply voltage, and if the time interval has elapsed, to provide the request to the voltage regulator system; and
    core logic configured to determine, while the first voltage adjustment logic is disabled, whether the power supply voltage has reached the target value, and to enable the first voltage adjustment logic if the power supply voltage has reached the target value, the core logic further configured to disable the first voltage adjustment logic before providing the request to the second voltage adjustment logic.

11. The system of claim 10, further comprising a timer configured to time the time interval, the time interval starting contemporaneously with the request to the voltage regulator system.

12. The system of claim 10, wherein the second voltage adjustment logic is configured to determine whether the time interval has elapsed based on a signal from the voltage regulator system.

13. The system of claim 10, wherein the request comprises an indication to the voltage regulator system to step the power supply voltage through a plurality of intermediate voltage levels during the time interval.

14. The system of claim 10, wherein the first voltage adjustment logic is further configured to provide a voltage adjustment request to the voltage regulator system while the first voltage adjustment logic is enabled.

15. The system of claim 10, wherein the first voltage adjustment logic is configured to initiate fine voltage adjustments, and the second voltage adjustment logic is configured to initiate coarse voltage adjustments.

16. The system of claim 10, wherein the first voltage adjustment logic comprises Core Power Reduction (CPR) logic, and the second voltage adjustment logic comprises Dynamic Clock and Voltage Scaling (DCVS) logic.

17. The system of claim 10, wherein the core logic, the first voltage adjustment logic, and the second voltage adjustment logic are included in a system-on-a-chip (SoC), and the voltage regulator system is included in a power management integrated circuit (PMIC).

18. The system of claim 17, wherein the core logic is configured to determine whether the power supply voltage has reached the target value in response to a signal provided by the PMIC.

19. A computer-readable medium for dynamic power supply voltage adjustment in a computing device, the computer-readable medium comprising a non-transitory computer-readable medium having stored thereon in computer-executable form instructions that when executed by a processing system of the computing device configure the processing system to:
   set a power supply voltage with a first power logic;
   disable the first power logic for adjusting a power supply voltage;
   receive, while the first power logic is disabled, a request to adjust the power supply voltage from an initial value to a target value using a second power logic;
   initiate, while the first power logic is disabled, the second power logic in response to the request and an indication a time interval has elapsed since a previous request to adjust the power supply voltage;
   adjust the power supply voltage with the second power logic from the initial value to the target value;
   determine, while the first power logic is disabled, whether the power supply voltage has reached the target value; and
   enable the first power logic in response to determining the power supply voltage has reached the target value.

20. The computer-readable medium of claim 19, further comprising instructions for starting a timer contemporaneously with initiating the second power logic, wherein the indication the time interval has elapsed comprises an output of the timer.

21. The computer-readable medium of claim 19, further comprising instructions for receiving the indication the time interval has elapsed from a voltage regulator system.

22. The computer-readable medium of claim 19, wherein the second power logic comprises a voltage regulator stepping the power supply voltage through a plurality of intermediate voltage levels during the time interval.

23. The computer-readable medium of claim 19, further comprising instructions for initiating the first power logic after enabling the first power logic.

24. The computer-readable medium of claim 19, wherein the first power logic comprises Core Power Reduction (CPR) logic, and the second power logic comprises Dynamic Clock and Voltage Scaling (DCVS) logic.

* * * * *